United States Patent
Sharma et al.

(10) Patent No.: US 11,985,297 B2
(45) Date of Patent: May 14, 2024

(54) AUTOSTEREOSCOPIC THREE-DIMENSIONAL CAMPFIRE DISPLAY

(71) Applicant: GM Global Technology Operations LLC, Detroit, MI (US)

(72) Inventors: Manoj Sharma, Troy, MI (US); Kai-Han Chang, Sterling Heights, MI (US); Thomas A. Seder, Fraser, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/888,767

(22) Filed: Aug. 16, 2022

(65) Prior Publication Data
US 2024/0064281 A1 Feb. 22, 2024

(51) Int. Cl.
*H04N 13/356* (2018.01)
*G02B 30/30* (2020.01)
*H04N 13/31* (2018.01)

(52) U.S. Cl.
CPC ........... *H04N 13/356* (2018.05); *G02B 30/30* (2020.01); *H04N 13/31* (2018.05)

(58) Field of Classification Search
CPC .... H04N 13/356; H04N 13/31; H04N 13/305; G02B 30/30; G06V 20/10; G06V 20/20; G06V 20/56; G06V 20/182; G06V 20/188; G06V 20/194; G06V 20/176; B60K 35/00; B60K 2370/177; B60R 1/22; B60R 1/20; B60R 1/23; B60R 1/27; B60R 1/28; B60R 1/31; G06T 19/006

USPC .......................................................... 348/51
See application file for complete search history.

(56) References Cited

U.S. PATENT DOCUMENTS

| 2010/0046050 A1* | 2/2010 | Kroll | G03H 1/2294 |
| | | | 359/9 |
| 2018/0147985 A1* | 5/2018 | Brown | H04N 23/63 |
| 2019/0243151 A1* | 8/2019 | Hansen | G02B 27/0093 |

FOREIGN PATENT DOCUMENTS

DE 102020200044 A1 * 7/2021

OTHER PUBLICATIONS

Machine translation of DE 102020200044 A1 (Year: 2021).*
United States Patent and Trademark Office. U.S. Appl. No. 17/746,243, filed May 17, 2022.

(Continued)

*Primary Examiner* — Christopher S Kelley
*Assistant Examiner* — Ana Picon-Feliciano
(74) *Attorney, Agent, or Firm* — Vivacqua Crane, PLLC (57) ABSTRACT

A system for generating a centrally located floating three-dimensional image display for a plurality of passengers positioned within a vehicle includes a plurality of autostereoscopic three-dimensional displays, one autostereoscopic three-dimensional display individually associated with each one of the plurality of passengers, and a controller in communication with each of the plurality of autostereoscopic three-dimensional displays and adapted to cause each one of the plurality of autostereoscopic three-dimensional displays to display a three-dimensional image to the associated one of the plurality of passengers, wherein, each of the plurality of passengers perceives the three-dimensional image floating at a central location within the vehicle.

13 Claims, 4 Drawing Sheets

(56) References Cited

OTHER PUBLICATIONS

United States Patent and Trademark Office. U.S. Appl. No. 17/824,210, filed May 25, 2022.
United States Patent and Trademark Office. U.S. Appl. No. 17/842,253, filed Jun. 16, 2022.
United States Patent and Trademark Office. U.S. Appl. No. 17/842,272, filed Jun. 16, 2022.

* cited by examiner

AUTOSTEREOSCOPIC THREE-DIMENSIONAL CAMPFIRE DISPLAY

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing. Additionally, current display screens only present a two-dimensional image for a passenger to view.

While current systems achieve their intended purpose, there is a need for a new and improved system for providing a floating three-dimensional image that appears centrally located within the vehicle to all the passengers within the vehicle.

SUMMARY

According to several aspects of the present disclosure, a system for generating a centrally located floating three-dimensional image display for a plurality of passengers positioned within a vehicle includes a plurality of autostereoscopic three-dimensional displays, one autostereoscopic three-dimensional display individually associated with each one of the plurality of passengers, and a controller in communication with each of the plurality of autostereoscopic three-dimensional displays and adapted to cause each one of the plurality of autostereoscopic three-dimensional displays to display a three-dimensional image to the associated one of the plurality of passengers, wherein, each of the plurality of passengers perceives the three-dimensional image floating at a central location within the vehicle.

According to another aspect, each one of the plurality of autostereoscopic three-dimensional displays comprises a display panel and a parallax barrier mounted to the display panel, on a side of the display panel facing the associated one of the plurality of passengers.

According to another aspect, the display panel of each one of the plurality of autostereoscopic displays is a transparent display.

According to another aspect, the display panel of each one of the plurality of autostereoscopic displays is a transparent organic light emitting diode.

According to another aspect, the parallax barrier mounted onto each one of the plurality of autostereoscopic displays comprises a plurality of parallel, vertical apertures, wherein the parallax barrier is adapted to divide the image displayed such that a left eye and a right eye of a passenger viewing the autostereoscopic display see different portions of the display and the passenger perceives a three-dimensional image.

According to another aspect, each of the plurality of autostereoscopic displays is equipped with eye tracking capability, wherein, for each of the plurality of autostereoscopic displays, the controller is configured to position the parallax barrier relative to the displayed image based on the position and orientation of eyes of the associated passenger, and to change the position of the parallax barrier automatically in response to movement of the eyes of the associated passenger.

According to another aspect, the parallax barrier mounted onto each one of the plurality of autostereoscopic displays is selectively actuatable by the controller.

According to another aspect, the parallax barrier comprises a liquid crystal display.

According to another aspect, the controller is configured to cause each of the plurality of autostereoscopic displays to display one of a different perspective of a three-dimensional object, wherein each passenger perceives a different perspective of the same three-dimensional object, a different three-dimensional object, wherein each passenger perceives a different three-dimensional object, and the same three-dimensional object, wherein each passenger perceives the same perspective of the same three-dimensional object.

According to another aspect, each of the plurality of autostereoscopic displays is moveable between a retracted position and an extended position.

According to another aspect, each of the plurality of autostereoscopic displays is supported from one of a roof of the vehicle, a floor of the vehicle, and an armrest within the vehicle.

According to another aspect, an orientation of each of the plurality of autostereoscopic displays is one of fixed and adjustable.

According to another aspect, each of the plurality of autostereoscopic displays is equipped with head tracking capability, wherein an orientation of each of the plurality of autostereoscopic displays changes automatically in response to movement of a head of the associated one of the plurality of passengers.

According to several aspects of the present disclosure, a system for generating a centrally located floating three-dimensional image display for a plurality of passengers positioned within a vehicle includes a plurality of autostereoscopic three-dimensional displays, one autostereoscopic three-dimensional display individually associated with each one of the plurality of passengers, and a controller in communication with each of the plurality of autostereoscopic three-dimensional displays and adapted to cause each one of the plurality of autostereoscopic three-dimensional displays to display a three-dimensional image to the associated one of the plurality of passengers, wherein, each of the plurality of passengers perceives the three-dimensional image floating at a central location within the vehicle, each one of the plurality of autostereoscopic three-dimensional displays including a transparent display panel and a parallax barrier mounted to the display panel, on a side of the display panel facing the associated one of the plurality of passengers, the parallax barrier including a plurality of parallel, vertical apertures, wherein the parallax barrier is adapted to divide the image displayed such that a left eye and a right eye of a passenger viewing the autostereoscopic display see different portions of the display and the passenger perceives a three-dimensional image.

According to another aspect, the display panel of each one of the plurality of autostereoscopic displays is a transparent organic light emitting diode.

According to another aspect, each of the plurality of autostereoscopic displays is equipped with eye tracking capability, wherein, for each of the plurality of autostereoscopic displays, the controller is configured to position the parallax barrier relative to the displayed image based on the position and orientation of eyes of the associated passenger, and to change the position of the parallax barrier automatically in response to movement of the eyes of the associated passenger.

According to another aspect, the parallax barrier mounted onto each one of the plurality of autostereoscopic displays is a liquid crystal display that is selectively actuatable by the controller.

According to several aspects of the present disclosure, a system for generating a centrally located floating three-dimensional image display for a plurality of passengers positioned within a vehicle includes a plurality of autostereoscopic three-dimensional displays, one autostereoscopic three-dimensional display individually associated with each one of the plurality of passengers, and a controller in communication with each of the plurality of autostereoscopic three-dimensional displays and adapted to cause each one of the plurality of autostereoscopic three-dimensional displays to display a three-dimensional image to the associated one of the plurality of passengers, wherein, each of the plurality of passengers perceives the three-dimensional image floating at a central location within the vehicle, each one of the plurality of autostereoscopic three-dimensional displays including a transparent organic light emitting diode display panel and a selectively actuatable liquid crystal parallax barrier mounted to the display panel, on a side of the display panel facing the associated one of the plurality of passengers, the parallax barrier including a plurality of parallel, vertical apertures, wherein the parallax barrier is adapted to divide the image displayed such that a left eye and a right eye of a passenger viewing the autostereoscopic display see different portions of the display and the passenger perceives a three-dimensional image, each of the plurality of autostereoscopic displays equipped with eye tracking capability, wherein, for each of the plurality of autostereoscopic displays, the controller is configured to position the parallax barrier relative to the displayed image based on the position and orientation of eyes of the associated passenger, and to change the position of the parallax barrier automatically in response to movement of the eyes of the associated passenger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7D is a perspective view of a fourth three-dimensional image wherein the perspective of the three-dimensional object is as viewed from a front left side of the three-dimensional object; and The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
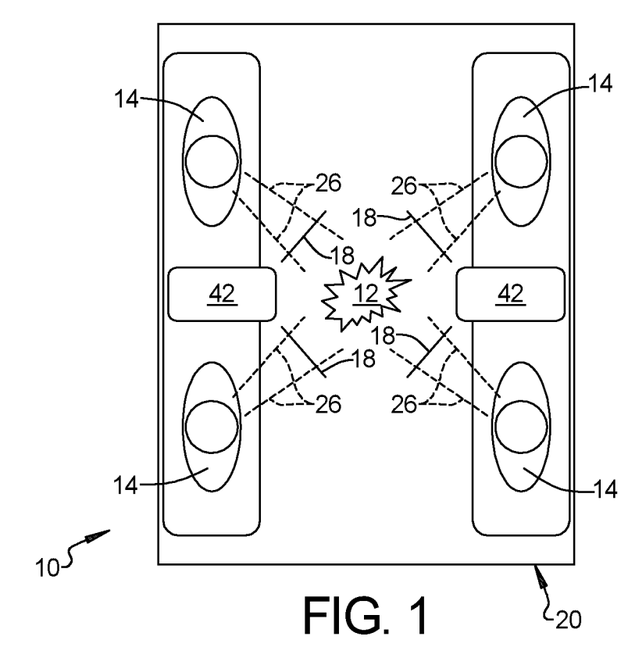
FIG. 1 is a schematic top view of a vehicle compartment having a system in accordance with an exemplary embodiment of the present disclosure.

Referring to FIG. 1, a system 10 for generating a centrally located floating three-dimensional image 12 display for a plurality of passengers 14 positioned within a vehicle, includes a plurality of autostereoscopic three-dimensional displays 18, one autostereoscopic three-dimensional display 18 individually associated with each one of the plurality of passengers 14. In an exemplary embodiment, a vehicle compartment 20 includes a plurality of seating positions occupied by a plurality of passengers 14. Each autostereoscopic three-dimensional display 18 is adapted to be viewed by one of the passengers 14.

A controller 16 is in communication with each of the plurality of autostereoscopic three-dimensional displays 18 and is adapted to cause each one of the plurality of autostereoscopic three-dimensional displays 18 to display a three-dimensional image 12 to the associated one of the plurality of passengers 14, wherein, each of the plurality of passengers 14 perceives the three-dimensional image 12 floating at a central location within the vehicle, centrally located relative to all of the passengers 14, as indicated by lines 26.

The controller 16 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

An autostereoscopic display 18 is a display that is adapted to display stereoscopic, or three-dimensional images by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D".

In an exemplary embodiment, the plurality of autostereoscopic displays 18 are adapted to display a three-dimensional image with variable virtual image distance. Three-dimensional images with variable virtual image distance allows the system 10 to project a floating image 12 to the passenger 14 with the capability of making the floating image 12 appear closer or further away from the passenger 14.

Figure 2A:
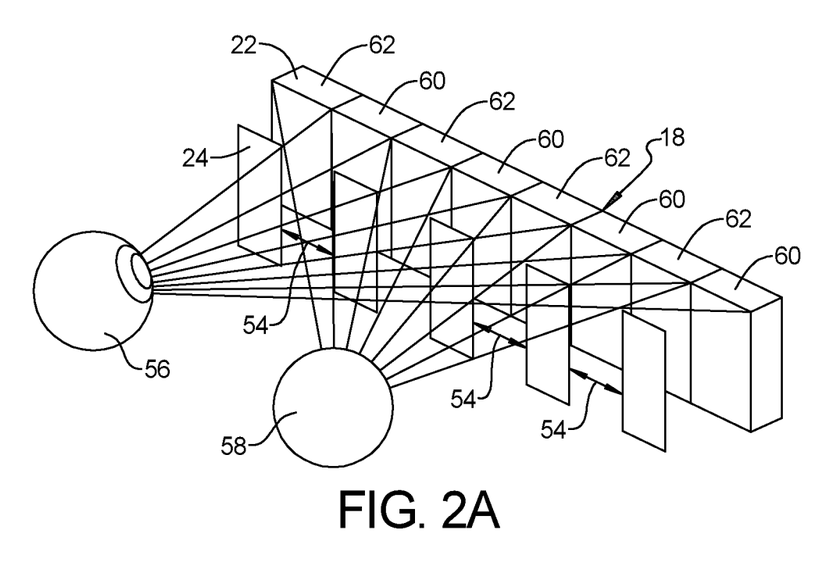
FIG. 2A is a schematic view of an autostereoscopic display of the present disclosure.
Figure 2B:
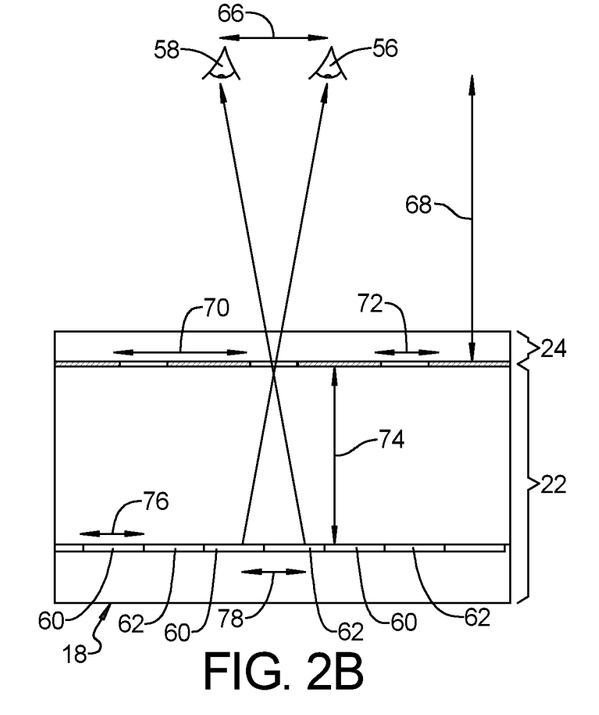
FIG. 2B is a schematic diagram of left and right eyes of a passenger looking onto an autostereoscopic display of the present disclosure.
Figure 3A:
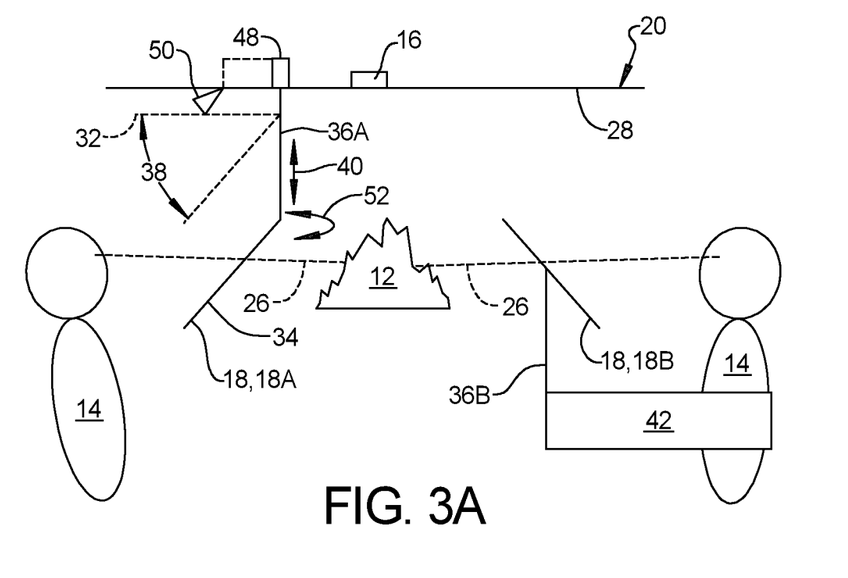
FIG. 3A is a schematic side view of two passengers within a vehicle compartment having a system according to an exemplary embodiment, wherein the autostereoscopic display is mounted onto a roof of the vehicle compartment.

Referring to FIG. 2A and FIG. 2B, in an exemplary embodiment, each one of the plurality of autostereoscopic three-dimensional displays 18 comprises a display panel 22 and a parallax barrier 24 mounted to the display panel 22, on a side of the display panel 22 facing the associated one of the plurality of passengers 14. Referring to FIG. 3A, the display panel 22 of each one of the plurality of autostereoscopic displays 18 is a transparent display. This allows a viewing passenger 14 to see through the display panel 22 and perceive the three-dimensional image 12 behind the display panel 22, as indicated by arrows 26. In an exemplary embodiment, the display panel 22 of each one of the plurality of autostereoscopic displays 18 is a transparent organic light emitting diode.

Referring to FIG. 2B, in an exemplary embodiment the parallax barrier 24 that is mounted onto each one of the plurality of autostereoscopic displays 18 comprises a plurality of parallel, vertical apertures 54. Referring to FIG. 2A, the parallax barrier 24 is adapted to divide the image displayed such that a left eye 56 and a right eye 58 of a passenger 14 viewing the autostereoscopic display 18 see different portions of the displayed image and the passenger 14 perceives a three-dimensional image. As shown, the orientation and position of the left eye 56 relative to the autostereoscopic display 18 allows the left eye 56 to see through the plurality of parallel vertical apertures 54 and to see left eye portions 60 of the image displayed by the display panel 22. Correspondingly, the orientation and position of the right eye 58 relative to the autostereoscopic display 18 allows the right eye 58 to see through the plurality of parallel vertical apertures 54 and to see right eye portions 62 of the image displayed by the display panel 22. This creates a sense of depth through parallax and the passenger 14 perceives a three-dimensional image 12.

Critical dimensional features of the parallax barrier 24 include eye separation 66, viewing distance 68, barrier pitch 70, aperture width 72, pixel-barrier separation 74, pixel aperture 76, and pixel pitch 78. Referring to FIG. 3A, in an exemplary embodiment, each of the plurality of autostereoscopic displays 18 is equipped with eye tracking capability, wherein, for each of the plurality of autostereoscopic displays 18, the controller 16 is configured to position the parallax barrier 24 relative to the displayed image based on the position and orientation of eyes 56, 58 of the associated passenger 14, and to change the position of the parallax barrier 24 automatically in response to movement of the eyes 56, 58 of the associated passenger 14. As shown, the system 10 includes a camera 50 for each autostereoscopic display 18 that is oriented to track the eye movement of the associated passenger 14. The camera 50 is in communication with the controller 16, and based on the position, orientation and movement of the associated passengers 14 eyes 56, 58, the controller 16 is configured to maintain the parallax barrier 24 relative to the image of the display panel 22 so the left eye 56 and the right eye 58 of the associated passenger 14 see the correct portions 60, 62 of the displayed image.

In an exemplary embodiment, the parallax barrier 24 that is mounted onto each one of the plurality of autostereoscopic displays 18 is selectively actuatable by the controller 16. This allows the controller 16 to switch between having the parallax barrier 24 off, wherein the parallax barrier 24 is completely transparent, and the viewing passenger 14 sees the image displayed on the display panel 22 as a two-dimensional image, and having the parallax barrier 24 on, wherein the parallax barrier 24 includes parallel vertical apertures 54 that cause the viewing passenger 14 to see the image displayed on the display panel 22 as a three-dimensional image. In one exemplary embodiment, the parallax barrier 24 comprises a liquid crystal display, wherein the plurality of vertical, parallel apertures 54 are selectively actuatable.

When the parallax barrier 24 is actuated, each of the left and right eyes 56, 58 of the viewing passenger 14 only see half of the displayed image, therefore, the resolution of the three-dimensional image is reduced. To improve resolution, in one exemplary embodiment, the controller 16 is configured to implement time-multiplexing by alternately turning the parallax barrier 24 on and off. Time-multiplexing requires the system 10 to be capable of switching the parallax barrier 24 on and off fast enough to eliminate any perceptible image flicker by the viewing passenger 14. Liquid crystal displays are particularly suitable for such an application.

In an exemplary embodiment, the controller 16 is configured to cause each of the plurality of autostereoscopic displays 18 to display one of 1) a different perspective of a three-dimensional object, wherein each passenger 14 perceives a different perspective of the same three-dimensional object, 2) a different three-dimensional object, wherein each passenger 14 perceives a different three-dimensional object, and 3) the same three-dimensional object, wherein each passenger 14 perceives the same perspective of the same three-dimensional object.

Figure 3B:
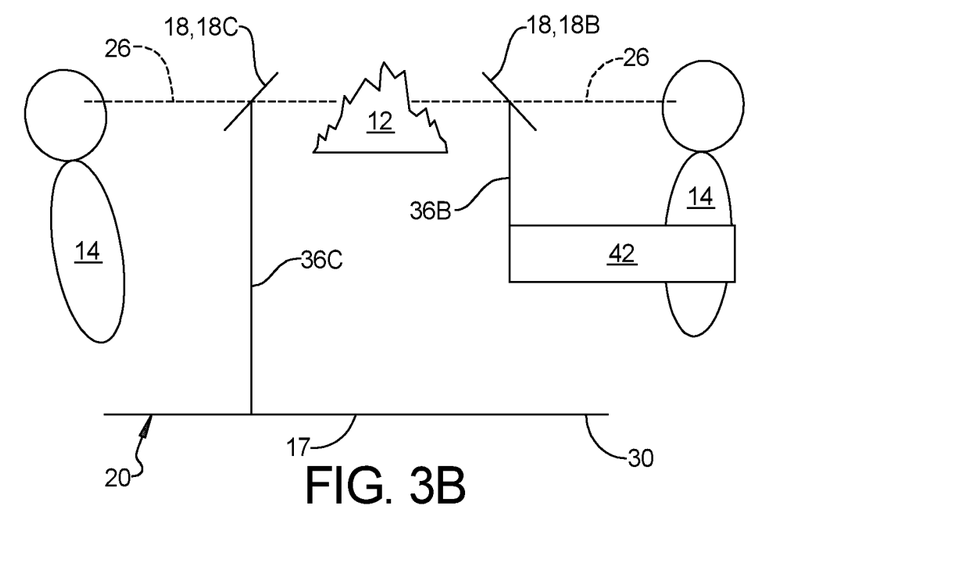
FIG. 3B is a schematic side view of two passengers within a vehicle compartment having a system according to an exemplary embodiment, wherein the autostereoscopic display is mounted onto a floor of the vehicle compartment.

Referring to FIG. 3A and FIG. 3B, each of the plurality of autostereoscopic displays 18 is transparent, wherein a passenger 14 can see through the autostereoscopic display 18, as indicated at 26. This allows the passenger 14 to perceive the floating image 12 at a distance beyond the autostereoscopic display 18 and further, allows the passenger 14 to see through the autostereoscopic display 18 and able to see the interior of the vehicle compartment 20 and other passengers 14 therein.

Referring to FIG. 3A, a autostereoscopic display 18A is shown, wherein the autostereoscopic display 18A is moveable between a retracted position 32 and an extended position 34. In an exemplary embodiment, the autostereoscopic display 18A is mounted onto a support shaft 36A that hangs down from the roof 28 of the vehicle compartment 20. In the retracted position 32, the autostereoscopic display 18A is positioned parallel to the roof 28 of the vehicle compartment 20. The autostereoscopic display 18A is pivotal relative to the support shaft 36A, as indicated by arrow 38, and the support shaft 36A is extendable vertically up and down, as indicated by arrow 40. From the retracted position 32, the autostereoscopic display 18A is pivoted down, and the support shaft 36A is extended downward to place the autostereoscopic display 18A in the extended position 34 for use. When in the extended position 34, the autostereoscopic display 18A is in operational proximity for viewing by the associated passenger 14.

Referring again to FIG. 3A, a autostereoscopic display 18B is shown, wherein the autostereoscopic display 18B is mounted onto an armrest 42 next to the passenger 14. The autostereoscopic display 18B is attached to a support shaft 36B that is attached to the armrest 42. While not shown, the autostereoscopic display 18B supported on the armrest 42 may also be moveable from a retracted position to an extended position. In one exemplary embodiment, the autostereoscopic display 18B is stowed within the armrest 42 when in the retracted position.

Referring again to FIG. 3B, an autostereoscopic display 18C is shown, wherein the autostereoscopic display 18C is mounted onto a support shaft 36C extending upward from the floor 30 of the vehicle compartment 20. While not shown, the autostereoscopic display 18C supported from the floor 30 of the vehicle compartment 20 may also be moveable from a retracted position to an extended position. In one exemplary embodiment, the autostereoscopic display 18C is stowed within the floor 30 of the vehicle compartment 20 when in the retracted position.

Figure 4:
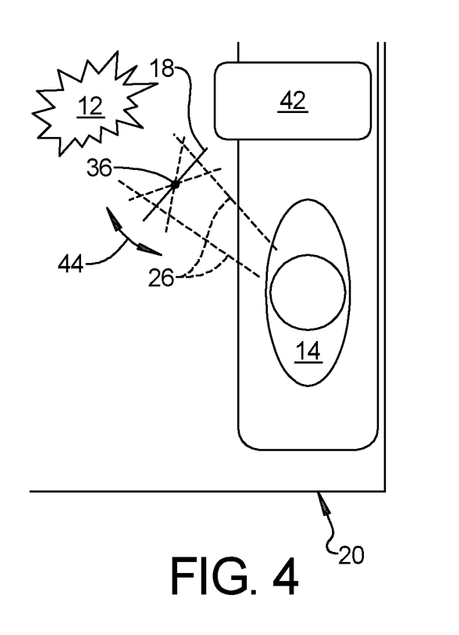
FIG. 4 is a schematic top view of a portion of a vehicle compartment including an autostereoscopic display that is horizontally pivotal.
Figure 5:
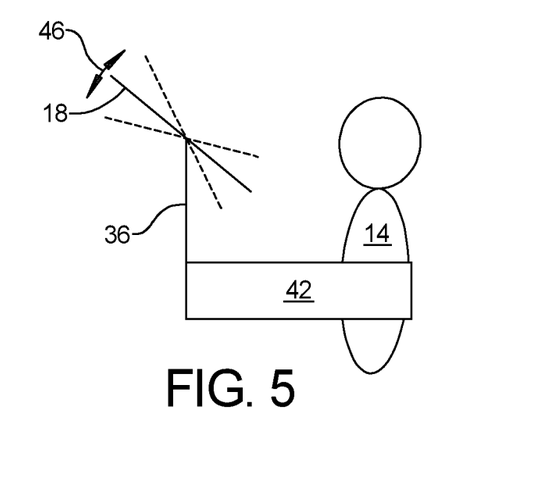
FIG. 5 is a schematic side view of a portion of a vehicle compartment including an autostereoscopic display that is vertically pivotal.

In an exemplary embodiment, an orientation of each of the plurality of autostereoscopic displays 18 is fixed. Thus, when the autostereoscopic displays 18 are in the extended position 34 angular orientation vertically and horizontally relative to the support shaft 36A, 36B, 36C is fixed. Alternatively, in another exemplary embodiment, an orientation of each of the plurality of autostereoscopic displays 18 is adjustable. Referring to FIG. 4, the autostereoscopic display 18 is pivotally mounted onto the support shaft 36 wherein the autostereoscopic display 18 is pivotal horizontally about an axis as shown by arrow 44. Referring to FIG. 5, the autostereoscopic display 18 is pivotally mounted onto the support shaft 36 wherein the autostereoscopic display 18 is vertically pivotal, as indicated by arrow 46. Adjustability of the autostereoscopic display 18 allows the autostereoscopic display 18 to be positioned according to the position of the passenger 14 within the vehicle compartment 20, and according to the height of the passenger 14, ensuring that the system 10 can be customized to accommodate passengers of different size and seating position/orientation preferences. In addition, adjustability of the orientation of the autostereoscopic display 18 allows the perceived location of the floating image 12 to be adjusted according to passenger 14 preferences.

In an exemplary embodiment, each of the plurality of autostereoscopic displays 18 is equipped with head tracking capability, wherein an orientation of each of the plurality of autostereoscopic displays 18 changes automatically in response to movement of a head of a passenger 14. Referring to FIG. 3A, the support shaft 36A is attached to a pivotal motor 48 in communication with a driver monitoring system within the vehicle. Driver monitoring systems within a vehicle include cameras that monitor head and eye movement of a driver/passenger within the vehicle. A camera 50 of a driver/passenger monitoring system is mounted within the vehicle compartment 20 and adapted to monitor head and eye movement of the passenger 14. This may be the same camera 50 used to provide eye tracking for the controller to maintain positioning of the parallax barrier. The motor 48 receives information from the camera 50 and in response to detection of head/eye movement by the passenger 14, pivots the support shaft 36A, and the autostereoscopic display 18A, as indicated by arrow 52, to change the orientation of the autostereoscopic display 18A, as indicated by arrow 44 in FIG. 4. Likewise, a motor may be adapted to pivotally change the orientation of the autostereoscopic display 18, as shown in FIG. 5, wherein the motor receives information from the camera 50 of a driver/passenger monitoring system, and in response to detection of head/eye movement by the passenger 14, pivots the autostereoscopic display 18, as indicated by arrow 46 in FIG. 5.

Figure 6:
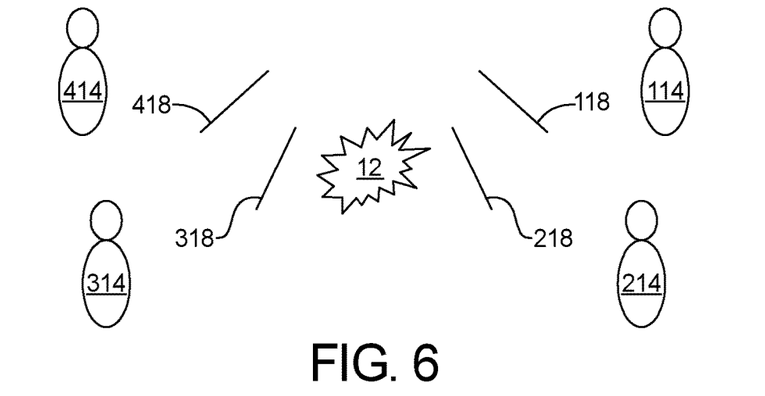
FIG. 6 is a schematic view of four autostereoscopic displays presenting three-dimensional images to four passengers.

Referring to FIG. 6, a schematic view shows first, second, third and fourth autostereoscopic displays 118, 218, 318, 418. The first autostereoscopic display presents a first three-dimensional image to a first passenger 114. The second autostereoscopic display presents a second three-dimensional image to a second passenger 214. The third autostereoscopic display presents a third three-dimensional image to a third passenger 314. The fourth autostereoscopic display presents a fourth three-dimensional image to a fourth passenger 214.

The controller can selectively change the image displayed to each passenger 114, 214, 314, 414. In one exemplary embodiment, the controller causes each of the plurality of autostereoscopic displays 118, 218, 318, 418 to display images of the same three-dimensional object 64, each image being a different perspective of the three-dimensional object 64, wherein each passenger 14 perceives a different perspective of the same three-dimensional object 64, and selective changing, by the controller, of the displayed images changes the image, and thus, the perspective of the three-dimensional object 64 perceived by each of the passengers 14.

Figure 7A:
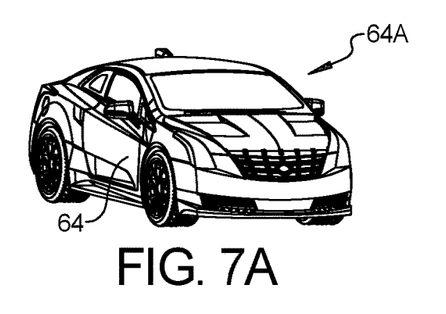
FIG. 7A is a perspective view of a first three-dimensional image wherein the perspective of a three-dimensional object is as viewed from a front right side of the three-dimensional object.
Figure 7B:
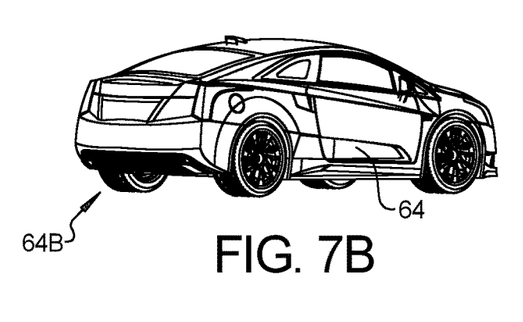
FIG. 7B is a perspective view of a second three-dimensional image wherein the perspective of the three-dimensional object is as viewed from a rear right side of the three-dimensional object.
Figure 7C:
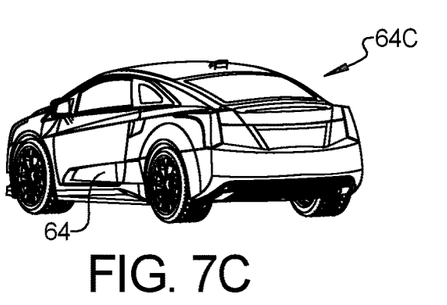
FIG. 7C is a perspective view of a third three-dimensional image wherein the perspective of the three-dimensional object is as viewed from a rear left side of the three-dimensional object.
Figure 7D:
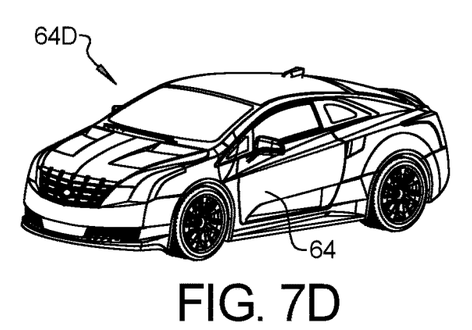

Referring again to FIG. 6 and to FIG. 7A, as shown in FIG. 7A, the first three-dimensional image 64A is of a vehicle, wherein the first passenger's 114 perspective of the vehicle is looking at the vehicle from the front right side of the vehicle. Referring again to FIG. 6 and to FIG. 7B, as shown in FIG. 7B, the second three-dimensional image 64B is of the vehicle, wherein the second passenger's 214 perspective of the vehicle is looking at the vehicle from the rear right side of the vehicle. Referring again to FIG. 6 and to FIG. 7C, as shown in FIG. 7C, the third three-dimensional image 64C is of the vehicle, wherein the third passenger's 314 perspective of the vehicle is looking at the vehicle from the rear left side of the vehicle. Referring again to FIG. 6 and to FIG. 7D, as shown in FIG. 7D, the fourth three-dimensional image 64D is of the vehicle, wherein the fourth passenger's 414 perspective of the vehicle is looking at the vehicle from the front left side of the vehicle.

In another exemplary embodiment, each of the plurality of three-dimensional images is a three-dimensional image of a different three-dimensional object, wherein each passenger 14 perceives a different three-dimensional object. This allows the system 10 to present the same floating image 12 to all the passengers 14 so they can view simultaneously, or alternatively, each passenger 14 can view a completely different three-dimensional image.

A system of the present disclosure offers several advantages. These include providing a floating three-dimensional image that is perceived by the passengers at a centrally location position within the vehicle compartment. This provides a camp-fire like viewing atmosphere where the passengers can all view a common floating image, or each passenger can view a unique floating image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a centrally located floating three-dimensional image display for a plurality of passengers positioned within a vehicle, comprising:
   a plurality of autostereoscopic three-dimensional displays, one autostereoscopic three-dimensional display individually associated with each one of the plurality of passengers; and
   a controller in communication with each of the plurality of autostereoscopic three-dimensional displays and adapted to cause each one of the plurality of autostereoscopic three-dimensional displays to display a three-dimensional image with variable virtual image distance to the associated one of the plurality of passengers, wherein, each of the plurality of passengers perceives the three-dimensional image floating at a central location within the vehicle.

2. The system of claim 1, wherein each one of the plurality of autostereoscopic three-dimensional displays comprises a display panel and a parallax barrier mounted to the display panel, on a side of the display panel facing the associated one of the plurality of passengers.

3. The system of claim 2, wherein the display panel of each one of the plurality of autostereoscopic displays is a transparent display.

4. The system of claim 3, wherein the display panel of each one of the plurality of autostereoscopic displays is a transparent organic light emitting diode.

5. The system of claim 3, wherein the parallax barrier mounted onto each one of the plurality of autostereoscopic displays comprises a plurality of parallel, vertical apertures, wherein the parallax barrier is adapted to divide the image displayed such that a left eye and a right eye of a passenger viewing the autostereoscopic display see different portions of the display and the passenger perceives a three-dimensional image.

6. The system of claim 5, wherein each of the plurality of autostereoscopic displays is equipped with eye tracking capability, wherein, for each of the plurality of autostereoscopic displays, the controller is configured to position the parallax barrier relative to the displayed image based on the position and orientation of eyes of the associated passenger, and to change the position of the parallax barrier automatically in response to movement of the eyes of the associated passenger.

7. The system of claim 5, wherein the parallax barrier mounted onto each one of the plurality of autostereoscopic displays is selectively actuatable by the controller.

8. The system of claim 7, wherein the parallax barrier comprises a liquid crystal display.

9. The system of claim 5, wherein the controller is configured to cause each of the plurality of autostereoscopic displays to display one of:
   a different perspective of a three-dimensional object, wherein each passenger perceives a different perspective of the same three-dimensional object;
   a different three-dimensional object, wherein each passenger perceives a different three-dimensional object; and
   the same three-dimensional object, wherein each passenger perceives the same perspective of the same three-dimensional object.

10. The system of claim 5, wherein each of the plurality of autostereoscopic displays is moveable between a retracted position and an extended position.

11. The system of claim 5, wherein each of the plurality of autostereoscopic displays is supported from one of a roof of the vehicle, a floor of the vehicle, and an armrest within the vehicle.

12. The system of claim 5, wherein an orientation of each of the plurality of autostereoscopic displays is one of fixed and adjustable.

13. The system of claim 5, wherein each of the plurality of autostereoscopic displays is equipped with head tracking capability, wherein an orientation of each of the plurality of autostereoscopic displays changes automatically in response to movement of a head of the associated one of the plurality of passengers.

* * * * *